(12) United States Patent
Kahn et al.

(10) Patent No.: US 7,800,044 B1
(45) Date of Patent: Sep. 21, 2010

(54) HIGH AMBIENT MOTION ENVIRONMENT DETECTION ELIMINATE ACCIDENTAL ACTIVATION OF A DEVICE

(75) Inventors: Philippe Kahn, Aptos, CA (US); Arthur Kinsolving, Santa Cruz, CA (US); Mark Andrew Christensen, Santa Cruz, CA (US); David Vogel, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 2 days.

(21) Appl. No.: 11/938,230

(22) Filed: Nov. 9, 2007

(51) Int. Cl.
*G01J 1/44* (2006.01)
*H05B 37/02* (2006.01)
*H05B 39/04* (2006.01)

(52) U.S. Cl. ............................ 250/214 AL; 340/501; 340/517; 455/550.1; 455/565

(58) Field of Classification Search ............ 250/214 AL; 455/456.1, 565, 550.1; 340/521, 540, 501, 340/517; 702/130
See application file for complete search history.

(56) References Cited

U.S. PATENT DOCUMENTS

| 5,386,210 | A  | * | 1/1995  | Lee ............................ 340/567 |
| 6,246,321 | B1 | * | 6/2001  | Rechsteiner et al. ........ 340/522 |
| 7,397,357 | B2 | * | 7/2008  | Krumm et al. .............. 340/501 |
| 2002/0173295 | A1 | | 11/2002 | Nykanen et al. |
| 2002/0190947 | A1 | | 12/2002 | Feinstein |
| 2004/0125073 | A1 | | 7/2004 | Potter et al. |
| 2005/0234676 | A1 | | 10/2005 | Shibayama |
| 2006/0136173 | A1 | * | 6/2006 | Case et al. .................. 702/182 |
| 2006/0167647 | A1 | * | 7/2006 | Krumm et al. .............. 702/130 |
| 2006/0289819 | A1 | * | 12/2006 | Parsons et al. ......... 251/129.04 |
| 2007/0004451 | A1 | | 1/2007 | Anderson |
| 2007/0075127 | A1 | * | 4/2007 | Rosenberg .................. 235/375 |
| 2007/0075965 | A1 | | 4/2007 | Huppi et al. |
| 2007/0156364 | A1 | | 7/2007 | Rothkopf |
| 2007/0161410 | A1 | * | 7/2007 | Huang et al. ................ 455/565 |
| 2007/0176898 | A1 | | 8/2007 | Suh |
| 2007/0259685 | A1 | * | 11/2007 | Engblom et al. ......... 455/550.1 |
| 2008/0165022 | A1 | * | 7/2008 | Herz et al. .................. 340/669 |
| 2008/0168361 | A1 | * | 7/2008 | Forstall et al. .............. 715/753 |
| 2008/0303681 | A1 | | 12/2008 | Herz et al. |
| 2009/0088204 | A1 | | 4/2009 | Culbert et al. |

FOREIGN PATENT DOCUMENTS

| EP | 1104143 | 5/2001 |
| EP | 0833537 | 7/2002 |
| WO | WO 99/22338 | 5/1999 |
| WO | WO 00/63874 | 10/2000 |

\* cited by examiner

*Primary Examiner*—Thanh X Luu
*Assistant Examiner*—Francis M Legasse, Jr.
(74) *Attorney, Agent, or Firm*—Blakely, Sokoloff, Taylor & Zafman, LLP; Judith A. Szepesi (57) ABSTRACT

A method and apparatus for determining when a device is placed in a high ambient motion environment (HAME). The method includes receiving sensor data, and based on the sensor data determining if the device has been placed in the HAME. When placement in the HAME is detected, the method further includes putting the device in a HAME mode. In one embodiment, putting the device in the HAME mode includes locking user input features.

27 Claims, 5 Drawing Sheets

HIGH AMBIENT MOTION ENVIRONMENT DETECTION ELIMINATE ACCIDENTAL ACTIVATION OF A DEVICE

FIELD OF THE INVENTION

The present invention relates to mobile devices, and more particularly to mobile devices including sensors.

BACKGROUND

Mobile devices are becoming more ubiquitous. Generally speaking mobile devices have keyboards or other user input elements such as touch sensitive screens, cursor controllers, etc. When the devices are put in a pocket or bag, there is a risk that the user-input elements are accidentally activated. For example, in the case of mobile phones, this is referred to as a pocket call.

One prior art solution to this is to provide the option to lock the user input elements. In the prior art this is usually done by pressing two buttons in sequence. Unlocking is similarly done by pressing two buttons.

SUMMARY OF THE INVENTION

A method and apparatus comprising at least one sensor, the sensor providing data to a placement detector. The sensor data used to determine when the device is placed in a high ambient motion environment. When the device is detected to have been placed in the high ambient motion environment, adjusting settings of the device appropriately.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus uses information from available sensors—in one embodiment motion sensor and ambient light detector—to determine when a device goes into a high ambient motion environment (HAME). High ambient motion environments include handbags, pockets, holsters, backpacks and similar locations where the device is likely to be jostled. The system automatically locks itself when insertion into a HAME is detected, such that no buttons are accidentally activated (lock the keypad etc). In one embodiment, the system may also reduce power consumption, as it is unlikely that the user will utilize the device while it is in the HAME. Subsequently, the system can unlock when the user removes the device from the HAME, for example lifts it up to look at the screen.

In order to detect when the device is being placed in a HAME, in one embodiment the motion signature is used along with analyzing the change in amount of ambient light as measured by the ambient light sensor. For the ambient light sensor input, in one embodiment, the clock (and thus sunrise/sunset information) is used to alter the algorithms to account for whether it is day or night. By looking at the data from both the accelerometer and the ambient light sensor, the system has a 'signature' which is associated with putting the device in a HAME. Equally, there is a signature for when a user picks up a device and looks at the device, or otherwise removes it from the HAME. While putting the device in the HAME may cause the locking of the device, removing the device from the HAME by picking up the device may cause the unlocking of the device.

In one embodiment, data from additional sensors such as proximity, temperature and other sensors may be additionally used in the detection of placing the device in and removing it from the HAME. In one embodiment, the tilt of the device, as measured by the accelerometer, is additionally used in determining when a user is holding the device and looking at the screen. It may be used, in one embodiment along with the ambient light sensor to adjust the display contrast.

Figure 1:
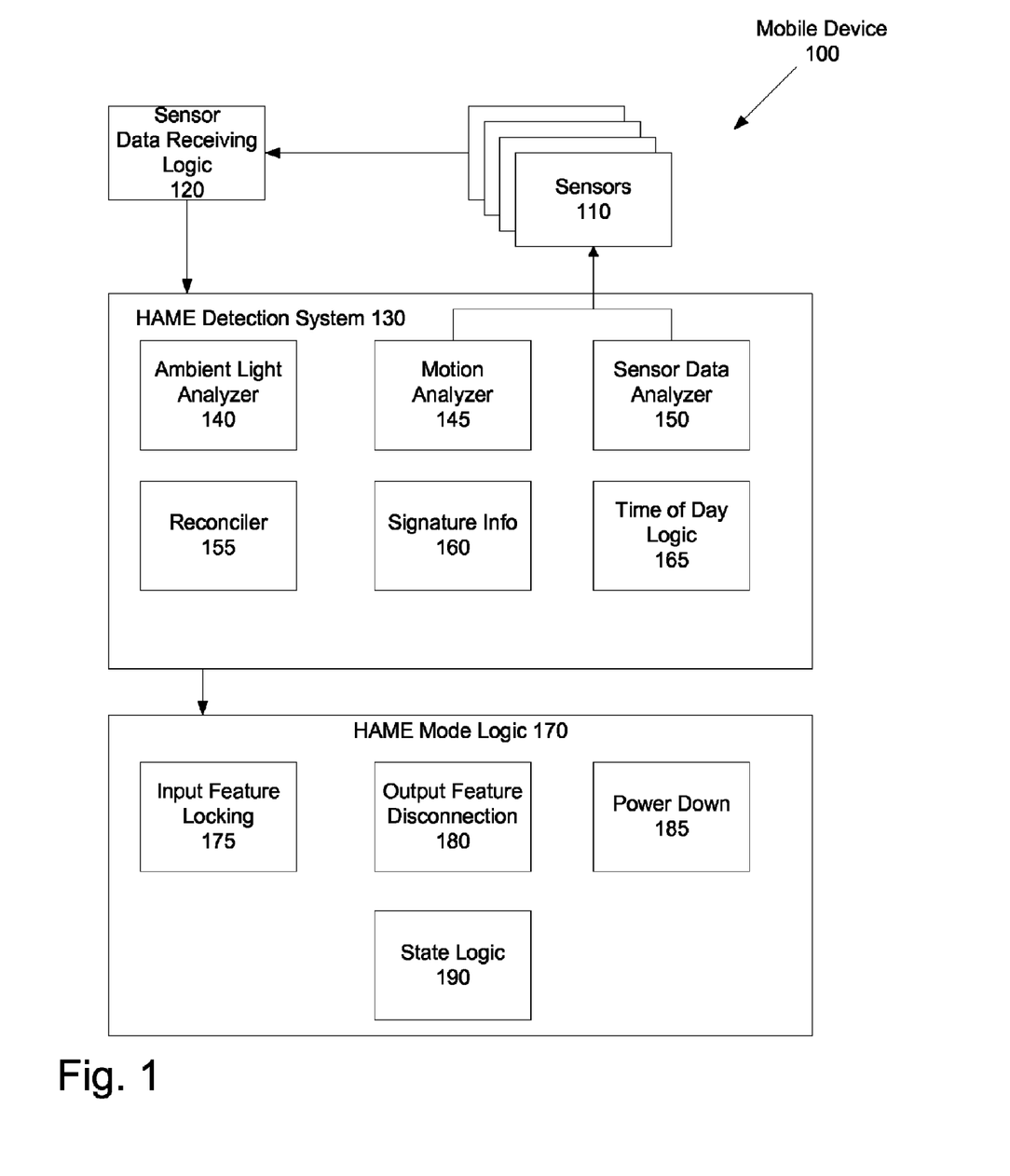
FIG. 1 is a block diagram of one embodiment of the system which may enable the functionality described.

FIG. 1 is a block diagram of one embodiment of the system which may enable the functionality described. The process includes a sensor data receiving logic 120. Sensor data receiving logic 120 receives data from one or more sensors 110. In one embodiment, the sensors 110 include at least a motion sensor or an ambient light sensor. In one embodiment, sensors 110 may further include temperature sensor, touch sensor, barometric pressure sensor, and other sensors. In one embodiment, sensor data receiving logic 120 does not receive the sensor data directly. Rather, the sensor data is initially processed by a logic (not shown) which determines if the sensor data may be relevant to determine whether the device is in a high ambient motion environment (HAME). If the sensor data is relevant, it is passed to the sensor data receiving logic 120. Otherwise, it is not.

The sensor data received by sensor data receiving logic 120 is passed on to HAME detection system 130. HAME detection system 130 includes at least one sensor data analyzer 150, which may include an ambient light analyzer 140, a motion analyzer 145, or an analyzer for another sensor type. The ambient light analyzer 140, in one embodiment, calculates the rate of change in ambient light, as detected by sensor 110. The ambient light analyzer 140, in one embodiment, outputs whether the ambient light indicates that the device is being placed in a HAME. In one embodiment, the ambient light analyzer 140 outputs a percentage chance that the device is being placed in the HAME.

Similarly, the motion analyzer 145 analyzes the motion sensor data. In one embodiment, the motion sensor data comes from an accelerometer. In one embodiment, as noted above, only relevant motion data is forwarded to the motion analyzer 145. In one embodiment, the motion analyzer 145 may turn on the ambient light sensor, if the ambient light sensor is a high power utilizing device. In one embodiment, the motion analyzer 145 in one embodiment outputs a percentage chance that the device is being placed in the HAME.

Sensor data analyzer 150 analyzes data from other sensors. In one embodiment, each sensor type may have separate analyzer logics. In one embodiment, any initial sensor may send data to the sensors 110, to turn on another, high power consuming, sensor, to confirm placement in the HAME.

In one embodiment, the system also includes a reconciler 155. The reconciler 155 reconciles data when multiple sensor analyzers have been used. In some instances, the sensor analyzers do not agree. Therefore, reconciler 155 creates a "combined" analysis based on the data from all of the sensor analyzers. In one embodiment, the output of the reconciler is either "yes" or "no" indicating whether the device is in the HAME or not. In one embodiment, each sensor analyzer logic outputs a percentage, indicating the likelihood that the data reflects that the device has been placed in the HAME, and/or removed from the HAME. In one embodiment, the percentages go from +100 indicating that the sensor data reflects conclusively that the device has been placed in the HAME, to −100 indicating that the sensor data reflects conclusively that the device has been removed from the HAME. The reconciler 155 creates a combined score. This combined score is used to calculate the result.

In one embodiment, the sensor analyzers use signature information 160, which provides one or more signatures for placement into the HAME and removal from the HAME for comparison. In one embodiment, signature information 160 may also provide exemplary non-HAME signatures. For example, for ambient light, the signature information 160 may include signatures for such events as sunset, sunrise, light switch turning on and off, user walking into or out of a dark area, and placement of device in the HAME, and removal from the HAME. In one embodiment, the system may include a step counter (not shown) which uses motion data to identify user steps. In one embodiment, data from the step counter is used with the signature information 160, to be able to detect if the user has walked into or out of a darker area. i.e. to distinguish between placement in a HAME and walking into/out of a dark room. In one embodiment, the ambient light analyzer 140 is adjusted based on a time of day. The time of day logic 165 provides the adjustment.

If the device is being placed into the HAME, or removed from the HAME, a signal is sent by HAME detection system 130 to HAME mode logic 170. HAME mode logic 170 may include one or more of the following elements: input feature locking 175, output feature disconnection 180, and power down 185. Input feature logic 175 locks one or more input mechanisms such as keyboards, touch pads, touch sensitive screens, rocker buttons, microphone, etc. Output feature disconnection 180 disconnects one or more output features, such as speakers, screen, etc. Power down 185 powers down one or more portions of the device. These elements 175, 180, 185 also work to reverse the device from HAME mode to normal mode. In one embodiment, a state logic 190 saves the state of the device prior to entering HAME mode. The device can then be restored, based on data in the state logic 190.

Figure 2:
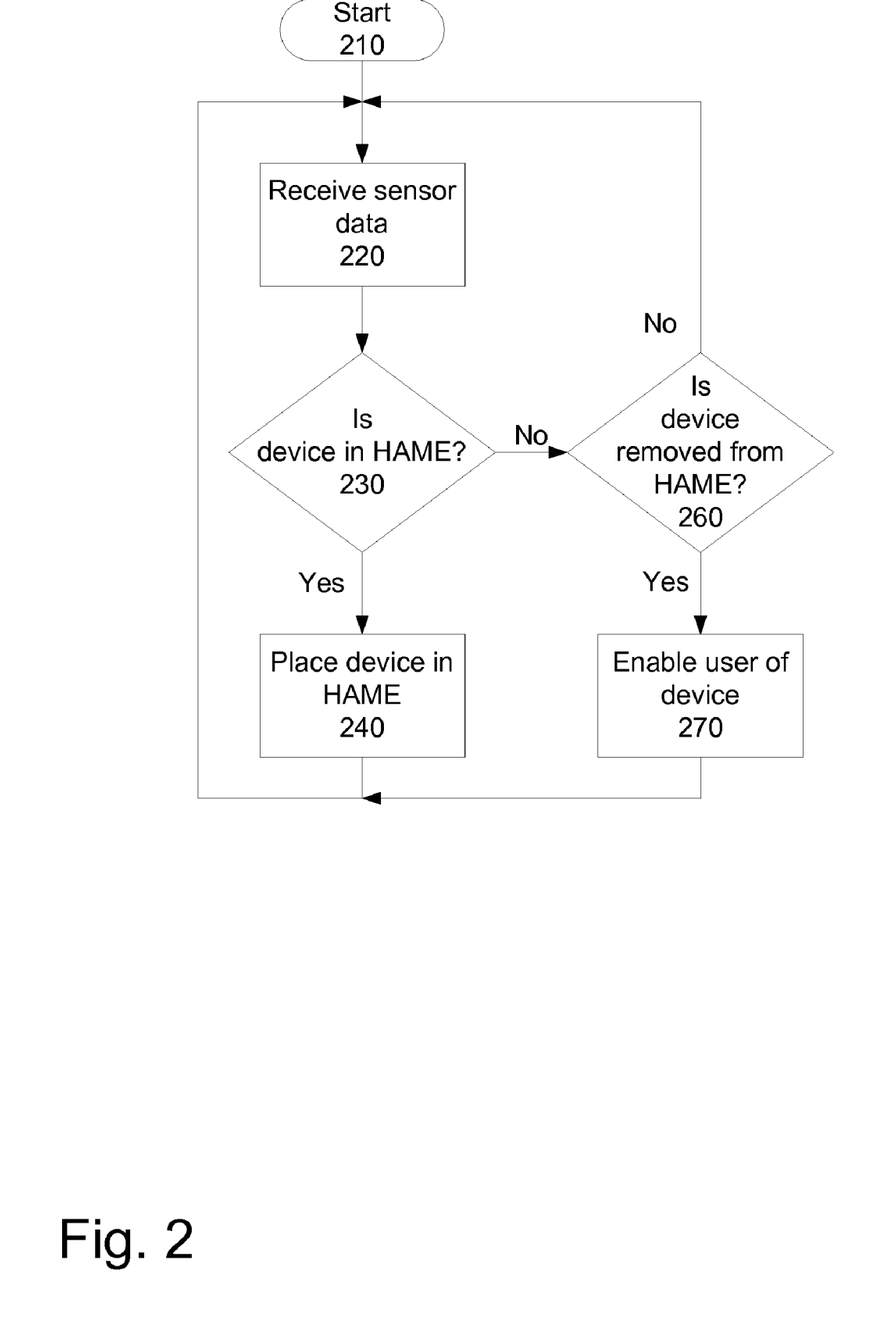
FIG. 2 is a flowchart of one embodiment of utilizing sensor data to detect placement in a high ambient motion environment.

FIG. 2 is a flowchart of one embodiment of utilizing sensor data to detect placement in a HAME. The process starts at block 210. At block 220, the sensor data is received. The sensor data may include data from a motion sensor. The motion sensor may be an accelerometer. The sensor data may further include data from another sensor, such as an ambient light sensor. An ambient light sensor detects ambient light levels.

At block 230, the process determines whether the device has been placed in the HAME. HAME, or high ambient motion environment, is defined as locations such as purses, bags, pockets, holsters, etc., where the device is not immediately accessible to the user, where the device is generally placed for carrying or storage, and where the device is likely to be jostled or encounter other objects which may trigger actions on the device. If the device has just been placed in a HAME, the process continues to block 240.

At block 240, the process places the device in a HAME mode. Placing the device in the HAME mode may include locking the device. Locking the device includes locking the keyboard and/or other user input features. Such user input features may include gesture commands. Placing the device in the HAME mode may further include placing the device in a low power mode. The low power mode may turn off non-essential features. In one embodiment, only those portions of the processor and device remain powered which are used to monitor for interrupt driven events, such as removal from the HAME, telephone calls (if device is a mobile telephone), etc. The process then returns to block 220, to continue receiving sensor data.

If at block 230, the process determined that the device was not being placed in a HAME, the process continues to block 260.

At block 260, the process determines whether the device has just been removed from the HAME. If so, the process continues to block 270. Otherwise, the process returns to block 220, to continue receiving the sensor data.

At block 270, the system performs the actions to transition the device from HAME mode, to enable use of the device, since it has been removed from the HAME. In one embodiment, the action may be unlocking the device's user input features. In one embodiment, if the device was in a low power mode while in the HAME, the process may wake up the device, place it in a different state. In one embodiment, the process may also re-activate any applications which were active when the device was placed in the HAME. For example, if the user was playing a game, the process may re-activate the game. The process then returns to block 220, to continue receiving sensor data.

Figure 3:
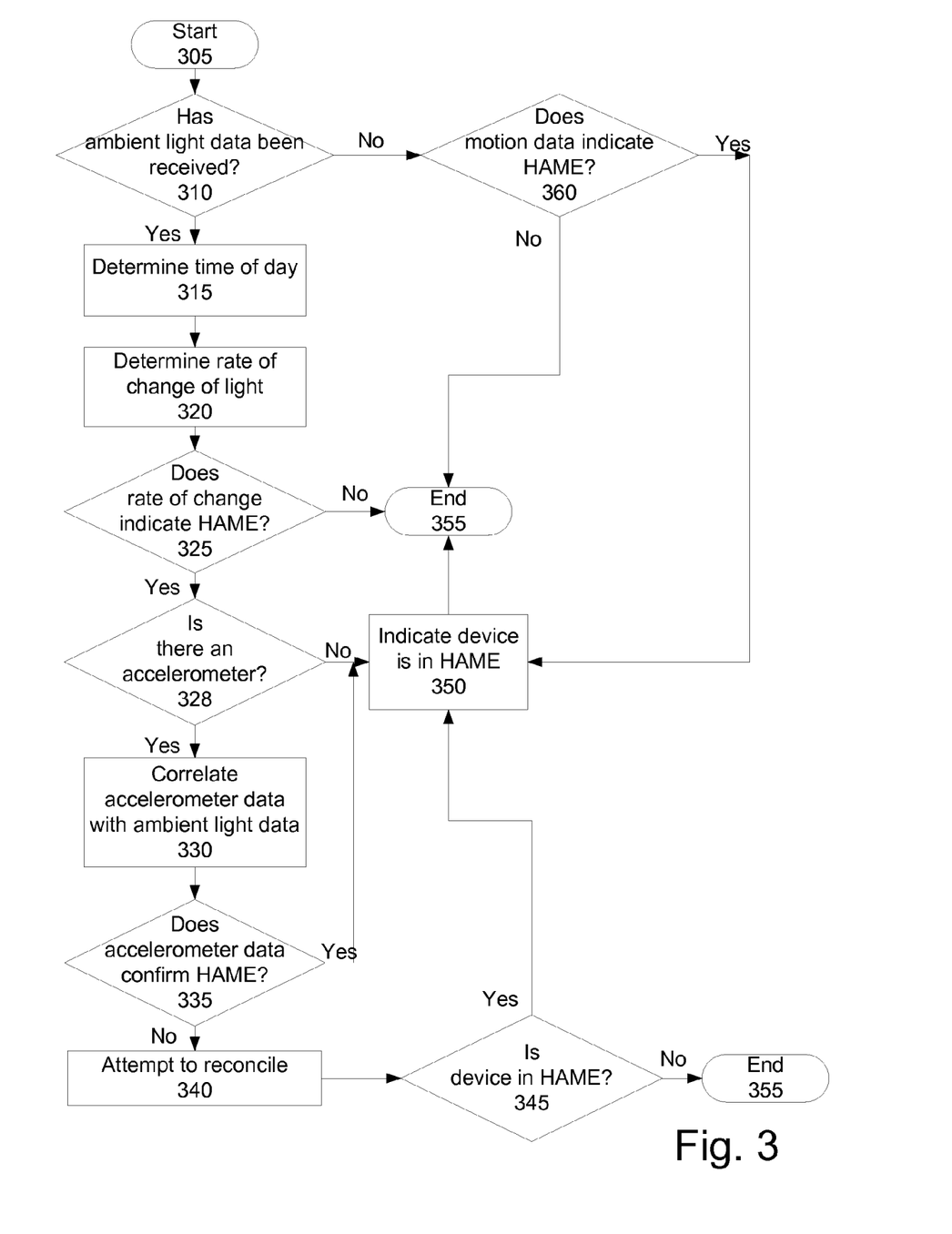
FIG. 3 is a more detailed flowchart of utilizing motion and ambient light data to detect placement.

FIG. 3 is a more detailed diagram of utilizing motion and ambient light data to detect placement in the HAME. The process starts at block 310, when the process determines whether ambient light data has been received. In one embodiment, ambient light data is only received when the level of ambient light changes. That is, each change is reported to the system. In one embodiment, an ambient light sensor receives ambient light data continuously. However, only changes in the ambient light data are sent to this analysis logic.

If ambient light data has been received, indicating a change in ambient light, the process continues to block 315. If there is no ambient light data, i.e. if there is no ambient light detector or no change in the level of ambient light, the process continues to block 360.

At block 315, the time of day is determined. In one embodiment, the time of day is used to adjust the expected ambient light in the environment. In one embodiment, the device's clock is synchronized with the network, and therefore is accurate for the local time zone. In one embodiment, in addition to time of day, the location is determined. The location may be determined based on network triangulation, GPS data, or user input. In one embodiment, the ambient light evaluation is adjusted based on the time of day. In one embodiment, thresholds for associating a rate of change with various actions are adjusted based on time of day. In one embodiment, if time of day data is not available, this step may be skipped.

At block 320, the rate of change and magnitude of change of the ambient light is determined. The rate of change allows the system to distinguish between various actions, such as the sun going down (slow steady rate of change), a light switch being turned off (very sudden), a user walking into or out of a dark room (steady, and accompanied by data from the step counter indicating that the user and device were moving), or the device being placed into the HAME (not perfectly steady, fairly rapid, and generally not accompanied by steady walking).

At block 325, the process determines whether the rate of change of the ambient light indicates that the device has been placed in the HAME. If so, the process continues to block 328 to determine whether there is an accelerometer within the device. If there is no accelerometer within the device, the process determines that the device is being placed in the HAME at block 350, and ends at block 355. If there is an accelerometer, the process continues to block 330.

At block 330, the process correlates the accelerometer data to the data from the ambient light detector. In one embodiment, the process determines whether the movement of the device corresponds to the rate of change of the ambient light. Generally speaking, as a user places the device in the HAME, the rate of change of the ambient light corresponds to the rate of movement of the device into the HAME. In other words, as more of the device is in the pocket or purse, there is less ambient light, and the motion of the device into the HAME is also detected.

In one embodiment, accelerometer data is used to increase the precision of the location detection algorithm to more precisely pinpoint the device location on the body and be used to identify more possible states/locations. The HAME is generally on the user's body or in an object the user carries such as a purse, holster, backpack, etc. In one embodiment, the accelerometer data is used to verify that the placement was in an appropriate location.

At block 335, the process determines whether the accelerometer data confirms that the device is being placed in the HAME. If so, the process continues to block 350, confirming that the device is being placed in the HAME.

Otherwise, the process continues to block 340. At block 340, the process attempts to reconcile the accelerometer data and the ambient light data. In one embodiment, the process determines how close to a nominal perfect signature the ambient light rate of change is. In one embodiment, the ambient light information on the device includes a nominal perfect signature, which is the signature expected for placing the device in the HAME. The process then attempts to determine how far from nominal perfect signature the accelerometer data is. Depending on which is closer, at block 345, the motion is identified as either placing the device in the HAME, or not. In another embodiment, each sensor indicates a percentage likelihood that the device has been placed in the HAME. If the combined percentage is above a threshold, the system indicates that the device is in the HAME. Otherwise, it does not. If the motion is identified as placing the device in the HAME, the process continues to block 350, confirming that the device is being placed in the HAME. Otherwise, the process continues to block 355, and ends, indicating that the device has not been placed in the HAME.

In some circumstances it may occur that the process determines that the device was placed in the HAME, and subsequently the user removes the device from the HAME mode manually, without the data that would usually indicate that the user has removed the device from the HAME. In other words, sometimes, the entry into the HAME may be misidentified. In that instance, in one embodiment, the expected signature for ambient light/motion data is adjusted to decrease the likelihood that the same mistake is made again.

If, at block 310 it was determined that there is no ambient light data, the process continues to block 360. No ambient light data may be the result of no change in ambient light, or no ambient light detector.

At block 360, the motion data is analyzed to determine if the motion data matches placement in the HAME. In one embodiment, there may be separate motion data signatures for placing in various types of environments, e.g. pants pocket, purse, backpack, holster, shirt pocket, etc. In one embodiment, the comparison is with all of those possibilities.

If the motion data indicates that the device has been placed in the HAME, the process continues to block 350, confirming that the device is being placed in the HAME. Otherwise, the process continues to block 355, and ends, indicating that the device has not been placed in the HAME.

In one embodiment, in the situation where there are additional sensors, such as proximity sensors, temperature sensors, touch sensor, etc. the input from those sensors may be used in addition to or instead of the ambient light and motion sensors discussed above. For example, with a proximity sensor, if there are a large number of small objects in proximity to the device, it is likely in the HAME. With a temperature sensor, the HAME is likely to be a steadier temperature than the environment at large. The touch sensor is obvious. Other sensors may be used, as appropriate to determine whether the device has been placed in the HAME.

Similarly, when the device is removed from the HAME, the appropriate sensor data is detected.

Figure 4:
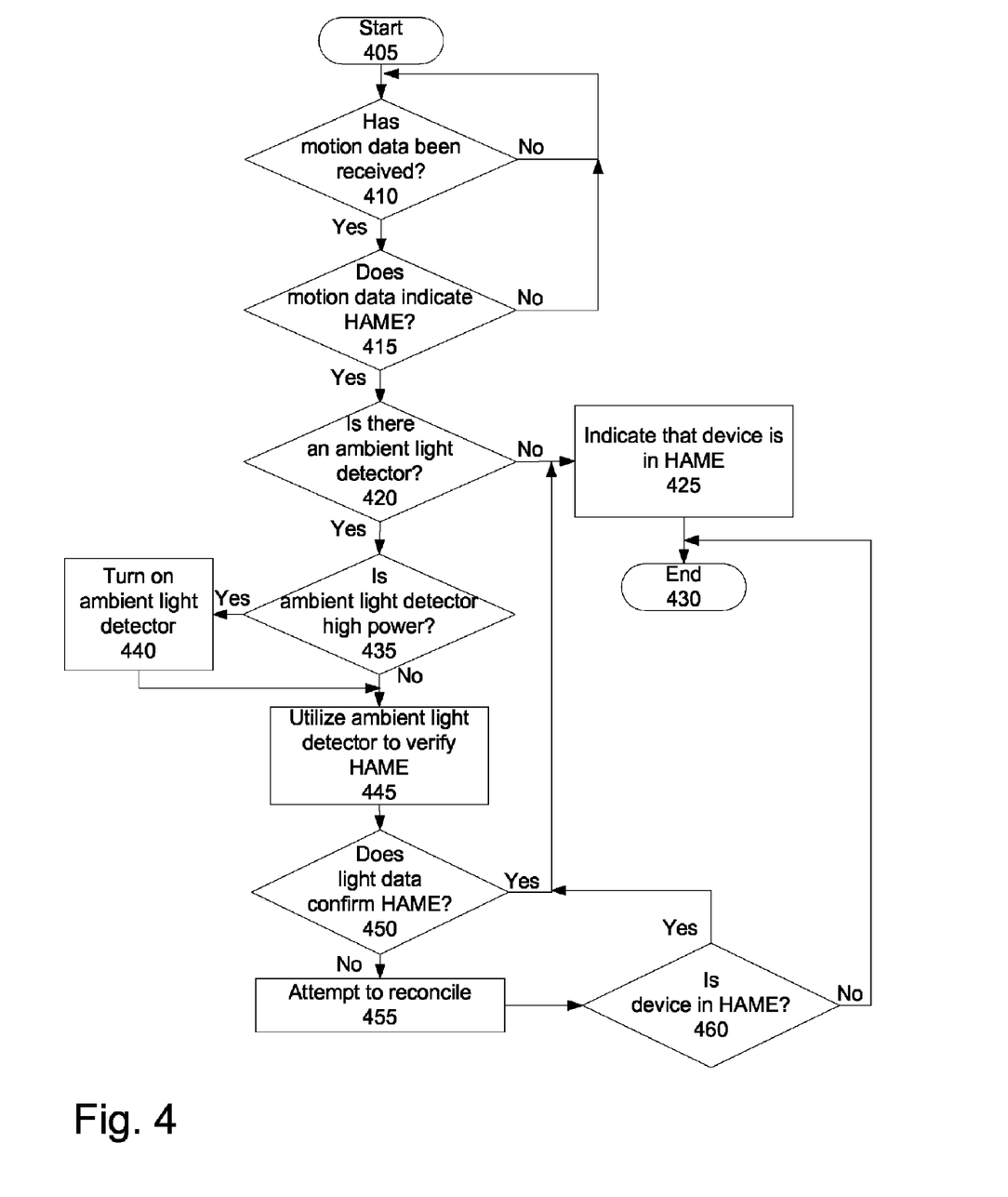
FIG. 4 is a more detailed flowchart of another embodiment of utilizing motion and ambient light data to detect placement.

FIG. 4 is a flowchart of a flowchart of another embodiment of detecting placement in the HAME. In one embodiment, this process is used by preference when the ambient light detector is a high power consuming sensor. The process starts at block 405. At block 410, the process determines whether motion data has been received. In one embodiment, the motion data is received directly from an accelerometer. In another embodiment, the motion data is received from a motion data processing logic, which provides motion data which may be relevant to determining whether the device has been placed in the HAME.

If no such data is received, the process returns to block 410, to continue monitoring the system.

If motion data is received, at block 415, the process determines whether the motion data indicates placement in the HAME. If not, the process returns to block 410, to continue monitoring motion data.

If the motion data does indicate that the device has been placed in the HAME, the process continues to block 420. At block 420, the process determines whether there is an ambient light detector. If there is no ambient light detector, the process continues to block 425. In one embodiment, the system also utilizes any other sensor analyzers, if they are available. At block 425, the system indicates that the device is in the HAME. The process then ends.

If there is an ambient light detector, the process continues to block 435. At block 435, the process determines whether the ambient light detector is a high power detector. A high power detector is a detector that uses a lot of battery power. For example, cameras usually include a light level detector. However, this light level detector is relatively high power, i.e. consumes a lot of battery power. Therefore, it is generally off unless the user has just depressed the camera button to take a picture. In one embodiment, the system can power such light detectors, for verification of the HAME placement. Since cameras are being incorporated into other mobile devices, such as cell phones, palm tops, etc. the ambient light detector associated with such cameras may be used to verify placement in the HAME for such devices.

If the ambient light detector is high power, at block 440 the ambient light detector is turned on. Then, at block 445, the ambient light is measured. In one embodiment, if the ambient light detector is a high power consuming sensor, this detection process may take place in very little time, for example under a second. This ensures that the process does not drain the device's batteries.

If the ambient light detector is not high power, the process continues directly to block 445, to measure the ambient light levels, and verify that the device has been placed in the HAME.

At block 450, the process determines whether the ambient light data confirms that the device is in the HAME. If so, the process continues to block 425 to indicate that the device is in the HAME.

If the ambient light data does not confirm, the process continues to block 455. At block 455, the process reconciles the accelerometer data and the ambient light data. In one embodiment, the process determines how close to a nominal perfect signature the motion data is. In one embodiment, the motion data on the device includes a nominal perfect signature, which is the signature expected for placing the device in the HAME. The process then attempts to determine how far from nominal perfect signature the ambient light data is. Depending on which is closer, at block 460, the motion is identified as either placing the device in the HAME, or not. In another embodiment, the data from each sensor analyzer provides a percentage likelihood that the device is being placed in the HAME. The reconciliation creates a combined likelihood. If that combined likelihood is above a threshold, the device is deemed to have been placed in the HAME. If the motion is identified as placing the device in the HAME, the process continues to block 425, confirming that the device is being placed in the HAME. Otherwise, the process continues to block 430, and ends, indicating that the device has not been placed in the HAME.

Figure 5:
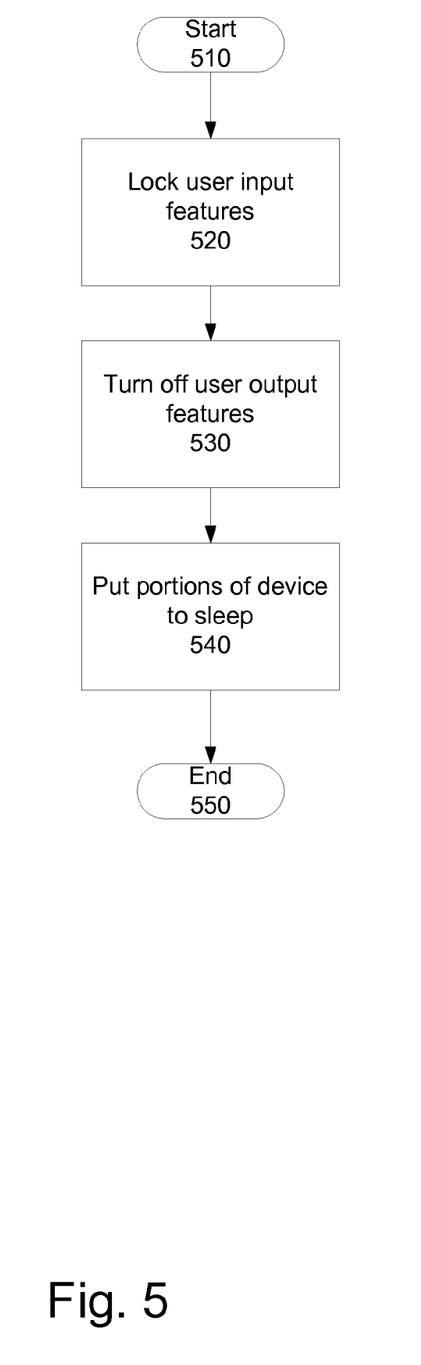
FIG. 5 is a flowchart of one embodiment of adjusting functionality based on placement.

FIG. 5 is a flowchart of one embodiment of adjusting functionality based on placement in the HAME. The process starts at block 510, when the data is received from the device indicating that the device has been placed in the HAME.

At block 520, the device locks user input features. These features can include a keyboard, a touch screen, a cursor controller, a microphone, or any other user input feature.

At block 530, the device turns off user output features. These features can include a computer screen, audio output, etc. In one embodiment, this is configurable, as the user may wish to leave on audio output, or other user output features. In one embodiment, if a headset is coupled to the device, whether plugged in or connected through Bluetooth or another wireless connection, the audio output is not turned off.

At block 540, the device puts those portions of the device that are not being used into sleep mode. These portions may include a part of the processor as well. Sophisticated circuits today can put portions of a system into sleep mode while maintaining other portions. In one embodiment, any portion of the system not utilized for determining whether the device is needed—i.e. sensors for identifying when the device is removed from the enclosed location, monitors for telephone calls, calendar alerts, and other interrupts—are shut down. In one embodiment, the system maintains prior state data for the device, enabling it to be reset to the same state as prior to entering the HAME mode.

The process then ends.

In one embodiment, independently the user may set which of these steps are taken when the device is in the HAME. For example, the user may indicate that the input features should always be locked, but the output features should not. In one embodiment, the default is that all three steps are taken when the system detects that the device is being placed in the HAME. In one embodiment, when the user manually unlocks the user input feature, the other steps are also reversed. In one embodiment, when the user takes the device out of the HAME, these steps are all reversed as well.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    detecting placement of a device into a high ambient motion environment (HAME) using two sensors, the two sensors including an accelerometer and an ambient light sensor, wherein the detecting comprises:
        making a preliminary determination that the device is being placed into the HAME utilizing motion data from the accelerometer; and
        validating the preliminary determination utilizing ambient light data from the ambient light sensor; and
    automatically placing the device in a HAME mode, the HAME mode ensuring that the device does not accidentally activate while the device is in the HAME.

2. The method of claim 1, wherein the HAME mode includes locking a user input feature on the device.

3. The method of claim 1, wherein the HAME mode includes partially powering down the device.

4. The method of claim 1, wherein the HAME mode includes turning off a user output feature on the device.

5. The method of claim 1, further comprising:
    after the device has been placed in the HAME mode, utilizing additional motion data and additional ambient light data to detect that the device has been removed from the HAME environment; and
    returning the device from the HAME mode to a normal mode.

6. The method of claim 1, further comprising:
    utilizing the motion data to identify a type of HAME environment in which the device has been placed, wherein the identified type of HAME environment includes one of a pants pocket, a purse, a backpack, a holster and a shirt pocket.

7. The method of claim 5, wherein the determination that the device has been removed from the HAME environment is made by comparing the additional motion data to a motion signature and by comparing the additional ambient light data to an ambient light signature.

8. A method comprising:
    utilizing an accelerometer to preliminarily detect placement of a device into a high ambient motion environment (HAME);
    turning on an ambient light detector, upon the preliminary detection;
    utilizing the ambient light detector to verify placement of the device into the HAME; and
    locking user input features and user output features of the device, in response to detecting placement of the device into the HAME.

9. The method of claim 8, further comprising:
    verifying that a change in the ambient light is not due to user motion by utilizing data from a step counter that counts a user's steps.

10. A device comprising:
    a motion sensor to generate motion data and an ambient light sensor to generate ambient light data;
    a high ambient motion environment (HAME) detection system to receive the motion data and the ambient light data, determine whether the motion data and ambient light data indicates placement of the device in a high ambient motion environment (HAME) utilizing one of motion data and ambient light data to detect placement into the HAME, and an other of the motion data and the ambient light data to validate the placement determination; and
a HAME mode logic to adjust a functioning of the device when placement in the HAME is detected, the HAME mode logic comprising:
a power down to power down a portion of the device not used in the HAME; and
a state logic to save a device state prior to power down, to enable restoring of the device state.

11. The device of claim 10, wherein the HAME detection system comprises:
an ambient light analyzer to analyze a change in ambient light; and
a motion analyzer to analyze motion data.

12. The device of claim 10, wherein the HAME detection system comprises:
a reconciler to reconcile data from a plurality of sensor data analyzers, the reconciler outputting whether the device is in the HAME.

13. The device of claim 10, wherein the HAME mode logic comprises:
input feature locking to lock input features of the device.

14. The device of claim 10, wherein the motion sensor comprises a step counter for counting a user's steps.

15. A mobile device comprising:
at least two sensors;
at least two sensor analyzers, each to receive data from one of the at least two sensors, and to determine whether the mobile device has been placed in a high ambient motion environment (HAME);
a reconciler to reconcile data from the at least two sensor analyzers, and to determine when the mobile device has been placed in the HAME;
an input feature locking to lock input features of the mobile device when the sensor analyzer indicates that the mobile device has been placed in the HAME;
an output feature disconnection to turn off output features of the mobile device when the sensor analyzer indicates that the mobile device has been placed in the HAME;
a power down logic to power down a portion of the mobile device when the mobile device is in the HAME, wherein powering down the portion of the mobile device includes closing an application; and
a state logic to save a state of the mobile device, including the state of the application, prior to the power down, and to enable restoring of the state of the mobile device, including the state of the application, upon removal from the HAME.

16. The mobile device of claim 15, further comprising:
the at least two sensor analyzers to detect removal from the HAME, and the input feature locking to unlock the input features of the mobile device when the sensor analyzers indicate that the mobile device has been removed from the HAME.

17. A device comprising:
an accelerometer to generate motion data;
an ambient light sensor to generate ambient light data;
a high ambient motion environment (HAME) detection system to preliminarily determine that the motion data indicates placement of the device into a high ambient motion environment (HAME), and validate the placement determination using the ambient light data; and
a HAME mode logic to adjust a functioning of the device when placement in the HAME is detected.

18. The device of claim 17, further comprising:
an input feature locking to lock input features of the mobile device when the sensor analyzer indicates that the mobile device has been placed in the HAME.

19. The device of claim 17, further comprising:
an output feature disconnection to turn off output features of the mobile device when the sensor analyzer indicates that the mobile device has been placed in the HAME.

20. A device comprising:
an accelerometer to generate motion data;
an ambient light sensor to generate ambient light data;
a high ambient motion environment (HAME) detection system to preliminarily determine that the ambient light data indicates placement of the device into a high ambient motion environment (HAME) and validate the placement determination using the motion data; and
a HAME mode logic to adjust a functioning of the device when placement in the HAME is detected.

21. The device of claim 20, further comprising:
an input feature locking to lock input features of the mobile device when the sensor analyzer indicates that the mobile device has been placed in the HAME.

22. The device of claim 20, further comprising:
an output feature disconnection to turn off output features of the mobile device when the sensor analyzer indicates that the mobile device has been placed in the HAME.

23. A method comprising:
detecting placement of a device into a high ambient motion environment (HAME) using two sensors, the two sensors including an accelerometer and an ambient light sensor, wherein the detecting comprises:
making a preliminary determination that the device is being placed into the HAME utilizing ambient light data from the ambient light sensor; and
validating the preliminary determination utilizing motion data from the accelerometer; and
automatically placing the device in a HAME mode, the HAME mode ensuring that the device does not accidentally activate while the device is in the HAME.

24. The method of claim 23, wherein the HAME mode includes locking a user input feature on the device.

25. The method of claim 23, wherein the HAME mode includes partially powering down the device.

26. The method of claim 23, wherein the HAME mode includes turning off a user output feature on the device.

27. A method for a user device, comprising:
generating motion data using a motion sensor and ambient light data using an ambient light sensor;
determining whether the motion data and the ambient light data indicates placement of the user device into a high ambient motion environment (HAME) utilizing one of the motion data and the ambient light data to detect placement into the HAME, and an other of the motion data and the ambient light data to validate the placement detection; and
adjusting a functioning of the user device when placement in the HAME is detected, the adjusting comprising:
powering down a portion of the user device not used in the HAME; and
saving a device state prior to powering down, to enable restoring of the device state.

* * * * *